F. A. KORMANN.

PROCESS OF PETROLEUM REDUCTION.

APPLICATION FILED DEC. 20, 1920.

Reissued Apr. 18, 1922. 15 337.

Inventor:
Frederick A. Kormann
Williams Bradbury
Scott McCabe
Attys

UNITED STATES PATENT OFFICE.

FREDERICK A. KORMANN, OF NEW YORK, N. Y., ASSIGNOR, BY MESNE ASSIGNMENTS, TO UNITED REFINERIES COMPANY, A CORPORATION OF NEW JERSEY.

PROCESS OF PETROLEUM REDUCTION.

15,337. Specification of Reissued Letters Patent. Reissued Apr. 18, 1922.

Original No. 1,332,849, dated March 2, 1920, Serial No. 245,331, filed July 17, 1918. Application for reissue filed December 20, 1920. Serial No. 432,132.

*To all whom it may concern:*

Be it known that I, FREDERICK A. KORMANN, a citizen of the United States, residing at New York city, in the county and State of New York, have invented new and useful Improvements in Processes of Petroleum Reduction, of which the following is a specification.

The invention relates to what is known as the alteration of a high boiling point hydrocarbon to a low boiling point hydrocarbon, and has no relation to that process commonly known as "cracking."

The primary object of the invention is to simplify the apparatus and the process of creating this physical change of a hydrocarbon oil, and thereby greatly increasing the efficiency of output.

The further object of the invention is to produce a process that will be without periods of idleness in its operation and which will produce a product which is sweet in odor, clear in color and does not become refractive when exposed to light.

The still further object of the invention is to produce an apparatus which shall be accessible for alteration, and shall require a minimum of time for interchange on cleaning, should such be necessary.

The further purpose of this invention is to procure from crude oil, kerosene, etc., a greater volume of gasolene with a low boiling point than has heretofore been possible to procure by any other process known to date.

Referring now to the drawings forming part of this specification,—

Figures 1, 2:
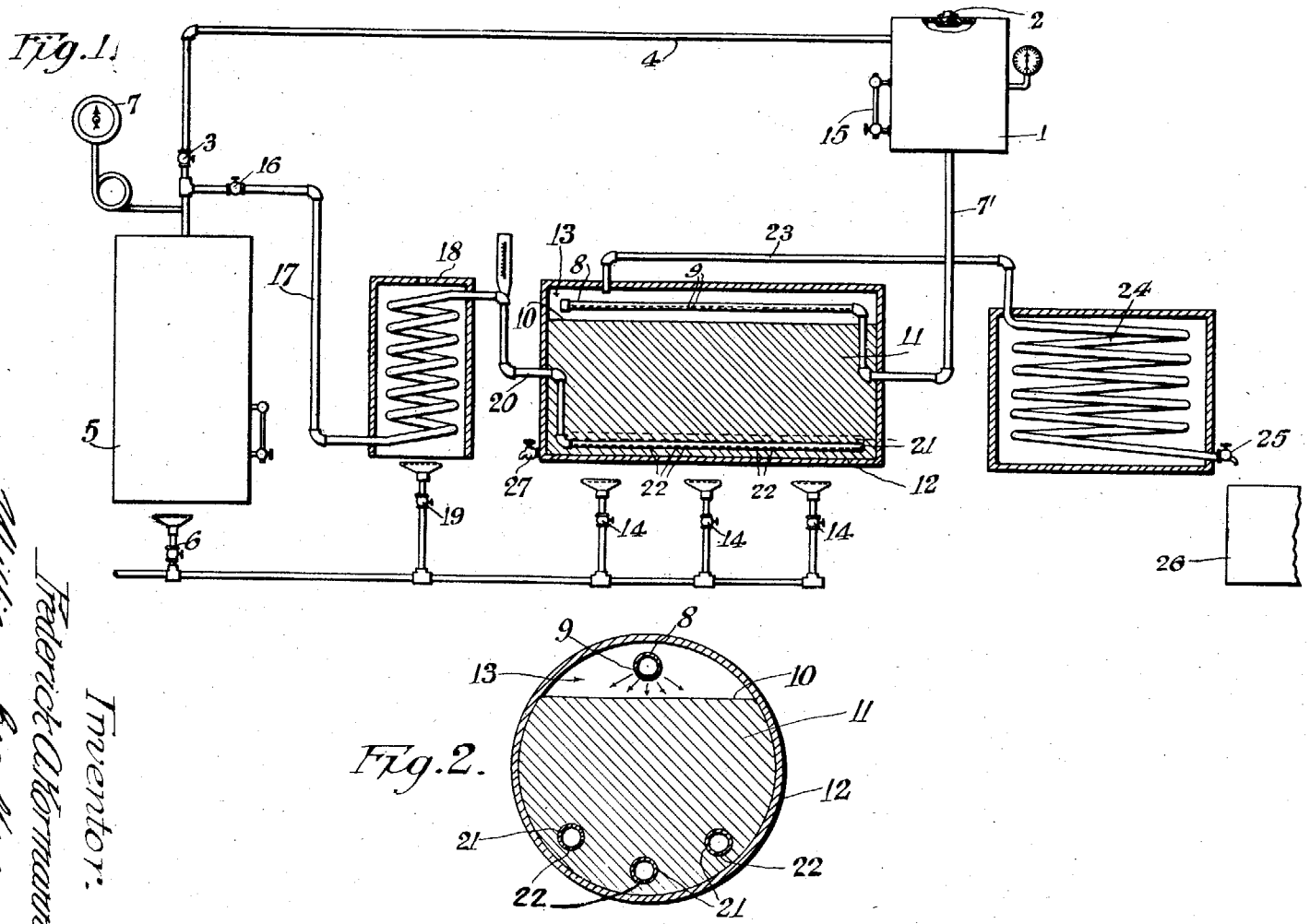
Figure 1 represents a diagrammatic view of a preferred form of apparatus for performing my process.
Figure 2 is a vertical transverse sectional view taken through the center of the retort to show the relative location of the pipes and the vapor chamber.

The operation is as follows: The hydrocarbon, which may be gas oil, kerosene, crude oil, or in fact almost any liquid or solid hydrocarbon, or a combination of either or both with a gaseous hydrocarbon, but is preferably a liquid such as crude oil or kerosene, is placed in the reservoir 1 and the latter made gas tight by closing the plug 2. Steam is then admitted by opening valve 3 in steam line 4 leading from the boiler 5 heated by any desired means, such as indicated by the numeral 6. I find it advisable to maintain a pressure of, say, 40 pounds per square inch, as indicated at 7, for treating an ordinary crude oil, and somewhat higher for the liquids heavier than 15° Baumé. The steam thus passing through pipe 4 not only exerts pressure on the oil confined in the reservoir 1, but heats it as well and drives same through the pipe 7′ to a spray 8 provided with graduated holes 9 for giving a fairly even supply over the upper surface 10 of the porous or absorbent material 11 which closely fills the entire retort 12 except for the relatively small vapor chamber 13 between the surface 10 and the upper wall of the retort. Shortly before the oil is driven into the retort, the burners 14 are lighted, subjecting the porous material to heat for the purpose of increasing the size of the minute orifices of the porous material and also to drive out, or rather to rarefy, the air therein occluded, thereby rendering the porous material in condition for maximum absorption. When the absorbent material is saturated or the receiver is emptied, as indicated by the gage glass 15, the valve 3 is closed, and the valve 16 in line 17 is opened, admitting steam to the superheater 18, the burner 19 of which is so regulated as to bring the temperature of the steam to a point about 100° F. above the end boiling point of the liquid being treated. A lower temperature is possible but the above stated degree of heat has been found in practice to give excellent results. The superheated steam passes through pipe 20 to a plurality of discharge pipes 21 provided with the usual graduated orifices to permit of uniform discharge of the superheated steam to all parts of the absorbent.

I find it preferable to locate these pipes somewhat away from the walls of the retort 12 and to space them as far apart as they in turn are spaced from the walls, thereby imposing an even duty upon each pipe.

It has also been found advisable to locate the discharge holes 22 in the bottoms of the pipes directing the steam downward, this to prevent, as far as practicable, the filling of the pipes 21 with oil and also to lessen the work of clearing them when so filled.

It is preferable not to turn out the burners 14 while driving the treated oil from the absorbent material, the heat from these burners being advantageous, partly in keeping the steam at the desired temperature and partly in expanding the absorbent or porous material.

The superheated steam drives the oil from its confinement up through the absorbent material to the vapor dome 13, and from thence to the vapor line 23 leading therefrom to a condenser coil 24 of any preferred type. The combined vapors are here condensed to a liquid which may be withdrawn through cock 25 to a retainer 26, this retainer in practice being a regulation oil tank having the usual accessories for discharge of the finished product, etc. The cock 25 is normally open so that no back pressure is exerted against the saturated steam, but it is closed when pressure is transmitted to the reservoir and retort during the first part of the process, i. e., while the absorbent material is being saturated.

Although the water and oil vapors mix in line 23, no difficulty is thereby encountered as the water sinks to the bottom of the tank 26, and is withdrawn from the system at that point. In the use of the process as now practiced, the indications are that the absorbent material may clog up after a considerable period of use at which time it should be cleaned or renewed, but I do find, however, that practically the entire volume of liquid put into the system is received therefrom in the form of gasolene from cock 25, or in a heavy liquor which is drained from the retort 12 by cock 27, the retort being placed at a slight angle to the horizontal for the purpose of easy drainage of this refuse liquor, the amount of such residual liquor varying from 0 for kerosene to nearly 90 per cent for some of the lower grade Mexican type crude oils, from which not over one or two per cent of gasolene can be obtained by the usual methods.

I may make one or both heads of the retort readily removable for convenience in replacing the absorbent material and the various pipes, or may provide manholes for this purpose, but since all these are well known in the art, they are not illustrated in the drawings and may readily be designed for the desired use by any mechanic skilled in the art.

The porous element materially contracts when saturated, probably due to the driving out of a great part of the occluded air by the heat and the sealing of the holes by the incoming relatively cool oil. In any event, it is true that bricks of absorbent material when saturated with oil are considerably smaller in volume and are somewhat darker in color than a normal brick, and that when a saturated brick is subjected to heat and the confined oil given off, it returns to its normal size and color and the same is true when a brick is left exposed to a current of air.

It is my belief that the contraction of the absorbent material after saturation has a material influence on the change of the physical properties of the confined oil, possibly by the exertion of great pressure in the same manner as the physical properties of bits of charcoal are totally altered by immersion in molten iron, followed by the chilling of the iron mass.

By this theory the oil entering one of the minute orifices of the porous material or absorbent mass, naturally causes a contraction first of all at the mouth of the cavity. The mouth of the orifice thus starts to contract before the oil reaches the further end of the cavity, and continues to contract until the mouth of the hole or pore is entirely closed, causing the formation of a closed cavity filled with the oil, which cavity, by the same law of contraction, continues to contract, thereby exerting upon the minute quantity of oil therein contained a pressure running up to a very considerable degree. This is true to a still greater extent when the absorbent material is hot and the oil entering the pores is relatively cool.

It may be, however, that the absorbent material I use is merely an inert catalytic agent, bearing in mind, however, that the relatively great contraction of the absorbent material, while saturated, is not a theory but is a physical fact, and permits of the alteration of the hydrocarbon molecules when finely divided, in the same manner as the chloroform when passed through platinum black in the presence of hydrogen changes to formalin.

I have stated in the three preceding paragraphs my present theories of the reasons for the operation of the process, but do not positively claim accuracy for them, and do not wish to be limited thereby, my invention consisting in the lowering of the boiling point of a relatively heavy carbon compound by the action of an absorbent or porous material, irrespective of whether that material acts as a catalyzer or as a contracting medium, or both.

To substantiate the theory of the physical change without the chemical alteration, I have proven that by using a high boiling point hydrocarbon, with an end point of 650° F., and subjecting same to treatment as above stated, the total volume on condensation has an end point of not to exceed 450° F., and is still of the same series of hydrocarbon products.

This process is adaptable to either the crude oil of petroleum, or the distillates thereof, and is continuous of operation.

The material used as the absorbing agent is preferably composed of shale clay, or a composition of shale clay, bone and willow charcoal, so combined as to be in the form of a solid mass by intermingling in the presence of moisture, and then compressed and dried and finally burned to produce a porous brick. I do not limit the invention to the use of shale clay and charcoal solely, but I am embodying as absorbent those elements or their vegetable, mineral or animal equivalents.

As an example of the merits of this process, I will give the data of a crude oil known as Kentucky crude of 33° Baumé gravity, treated under this process. The retort was charged to its maximum capacity of absorption with this above mentioned oil, and the distillation was carried to a point at which 95 per cent of the original volume used was converted into a gasolene body of approximately 50° Baumé, with an end point of 440° F., the usual yield being 33 per cent.

With Blackwell (Oklahoma) crude of 41° Baumé, the retort was charged to its maximum capacity of absorption, and the distillation was carried to a point at which 90 per cent of the original volume used was converted into a gasolene body of approximately 52° Baumé, with an end point of 404° F., the usual yield being 32 per cent.

With Texas coastal crude of 21.5° gravity, the retort was charged to its maximum capacity of absorption, and the distillation was carried to a point at which 34 per cent of the original volume used was converted into a gasolene body of approximately 50° Baumé, with an end point of 431° F., showing a yield of 340 per cent, of that produced by the best present practice.

From a Mexican crude oil of 12° Baumé gravity, we obtained under this process, 16 per cent of gasolene, with an end point of 450° F., the usual yield of this type being 2 per cent or less, my process, therefore, showing an eight-fold yield over the best results now obtainable.

A similar demonstration of the process was carried out with a kerosene, with an end point of 600° F., 44.5 Baumé gravity, the distillation carried to a point of exhaustion of the original charge, and the product had a gravity of 52° Baumé, with an end point of 450° F.

In thus treating kerosene by my process there is no more loss than is usual in the ordinary distillation of a good grade gasolene, and yet I secure a reduction of 150° F. in the boiling point of the liquid.

While I have described my process in its preferred form in great detail, I wish it distinctly understood that what I have developed is the broad invention of reducing hydrocarbon in the manner stated and desire to cover all minor changes and unpatentably different methods such as the shutting off of burners 14 during the process or the use of compressed air in pipe 4 for example, the use of which was discontinued when the advantages of the use of steam were understood.

What is claimed is:—

1. The process of expanding a capillary tube by heat, delivering a cooler liquid hydrocarbon thereto, thus contracting said capillary tube and in driving out the hydrocarbon in the form of a vapor by the application of further heat.

2. In a cyclic process of obtaining gasolene from a heavier hydrocarbon, the steps of subjecting a porous material to heat, filling the pores of such material while so heated with a liquid hydrocarbon thus cooling said material, reheating said porous material thereby driving the hydrocarbon from said pores in the form of a vapor thus placing such porous material in condition for a refilling of its pores with hydrocarbon.

3. In the process of obtaining gasolene from a relatively heavier hydrocarbon, the steps of filling the pores of a heated porous material with a relatively cooler liquid hydrocarbon heavier than gasolene thereby reducing the total volume of said material, and thereafter subjecting the material and the therein confined hydrocarbon to sufficient heat to vaporize a fraction of the hydrocarbon content as gasolene.

4. The process of obtaining a gasolene from a heavier hydrocarbon which consists in the cycle of heating a porous material to a temperature but slightly above the end boiling point of said hydrocarbon, delivering the hydrocarbon thereto, whereby said porous material is cooled and a portion of the hydrocarbon is volatilized, reheating the porous material thereby volatilizing another portion of said hydrocarbon and raising the porous material to the temperature necessary to continue the process and in condensing the gasolene vapors so produced.

5. The process of altering the physical properties of a hydrocarbon by absorbing said hydrocarbon, in a liquid state into the interstices of an absorbent material heated to a temperature slightly above the end boiling point of said hydrocarbon, and in then removing said hydrocarbon from said absorbent material by the application of heat without destroying said absorbent material in said process.

6. In a cyclic process of obtaining gasoline from a heavier hydrocarbon, the steps of subjecting a porous material to heat, filling the pores of such material while so heated with a liquid hydrocarbon, thus cooling said material, and removing the lighter hydrocarbon fractions by the application of heat.

7. The process of altering the physical properties of a hydrocarbon by absorbing said hydrocarbon into the interstices of an absorbent material, retaining it therein and contracting said absorbent material, and then removing said hydrocarbon from said absorbent material by the application of heat.

8. Bringing liquid oil into contact with a preheated absorbent material, stopping the flow of the oil away from said absorbent material, and separately removing by the application of heat and collecting, the lighter absorbed fraction and the residue respectively.

9. Absorbing liquid oil in a preheated calcined porous material, and separately removing by the application of heat and collecting, the lighter fractions of the absorbed portion, and the residue, respectively.

10. Absorbing liquid oil in a preheated absorbent material, distilling the most volatile fraction by said preheat whilst a heavier fraction is being absorbed, removing said heavier fraction by the application of heat, and separately collecting the still heavier residue.

11. Absorbing liquid oil in a porous material preheated to a temperature intermediate the vaporizing temperatures of the lighter and heavier distillable fractions, removing the lighter absorbed fraction by the application of heat, and separately collecting the residue.

12. Heating a porous material to a temperature but slightly above the end boiling point of the oil being treated, absorbing the oil therein, removing a lighter distillable fraction of the absorbed oil by the application of heat and collecting the residue.

13. Absorbing liquid oil in a preheated porous material, distilling the most volatile fraction by said preheat, removing a less volatile fraction from said porous material by the application of heat, and separately collecting the residue.

14. Preheating a porous material enclosed in a tank, bringing liquid oil into the said tank, whereby it is absorbed in said porous material, removing an absorbed fraction of said oil by said preheat, removing an additional fraction by the application of heat, and collecting the residue in the bottom of said tank.

15. The method of altering the boiling point of a hydrocarbon which comprises heating a mass of porous argillaceous material, saturating said heated mass with said hydrocarbon at a lower temperature, and adding more heat to bring the temperature of the porous mass and contents to a temperature but slightly above the end boiling point of the hydrocarbon being treated.

16. The method of converting crude petroleum into hydro-carbons of low boiling point which comprises placing a liquid mass of said crude petroleum into a filamentary state and quickly heating the mass throughout its entirety to a temperature above the boiling point of its lighter fractions such as benzine, but below the boiling point of its heavier fractions, whereby the lighter fractions can pass off in the form of vapor without being condensed within the liquid mass.

In witness whereof, I hereunto subscribe my name this 16th day of December, 1920.

FREDERICK A. KORMANN.